US012651756B2

(12) United States Patent
Ka

(10) Patent No.: US 12,651,756 B2
(45) Date of Patent: Jun. 9, 2026

(54) FUEL CELL

(71) Applicants: Hyundai Motor Company, Seoul (KR); Kia Corporation, Seoul (KR)

(72) Inventor: Dae Han Ka, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 359 days.

(21) Appl. No.: 18/045,726

(22) Filed: Oct. 11, 2022

(65) Prior Publication Data

US 2024/0006622 A1     Jan. 4, 2024

(30) Foreign Application Priority Data

Jun. 30, 2022    (KR) ........................ 10-2022-0080744

(51) Int. Cl.
| | |
|---|---|
| *H01M 8/0228* | (2016.01) |
| *H01M 8/0206* | (2016.01) |
| *H01M 8/0221* | (2016.01) |
| *H01M 8/0258* | (2016.01) |
| *H01M 8/0271* | (2016.01) |
| *H01M 8/0297* | (2016.01) |
| *H01M 8/2457* | (2016.01) |
| *H01M 8/248* | (2016.01) |
| *H01M 12/06* | (2006.01) |

(52) U.S. Cl.
CPC ....... *H01M 8/0228* (2013.01); *H01M 8/0206* (2013.01); *H01M 8/0221* (2013.01); *H01M 8/0258* (2013.01); *H01M 8/0271* (2013.01); *H01M 8/0297* (2013.01); *H01M 8/2457* (2016.02); *H01M 12/065* (2013.01)

(58) Field of Classification Search
CPC ............ H01M 8/0228; H01M 8/2457; H01M 8/0206; H01M 8/0221; H01M 8/0258; H01M 8/0271; H01M 8/0297; H01M 12/065
See application file for complete search history.

(56) References Cited

U.S. PATENT DOCUMENTS

| | | | |
|---|---|---|---|
| 10,033,051 B2 | 7/2018 | Kanno et al. | |
| 2005/0260479 A1* | 11/2005 | Raiser ................. | H01M 8/2484 |
| | | | 429/457 |
| 2014/0154605 A1 | 6/2014 | Brousseau et al. | |
| 2018/0040907 A1* | 2/2018 | Ishida ................. | H01M 8/0258 |

(Continued)

FOREIGN PATENT DOCUMENTS

| | | |
|---|---|---|
| JP | H08255616 A | 10/1996 |
| JP | 2008016216 A | 1/2008 |
| JP | 5426264 B2 | 2/2014 |

(Continued)

*Primary Examiner* — James Lee
(74) *Attorney, Agent, or Firm* — Slater Matsil, LLP

(57) ABSTRACT

In an embodiment a fuel cell includes a cell stack having a plurality of unit cells stacked in a first direction, first and second end plates disposed at both side ends of the cell stack, respectively, the second end plate having a resin part; and a sacrificial electrode located at the resin part of the second end plate adjacent to a cell configured to provide a highest potential for the unit cells, wherein the second end plate includes an inner side surface facing the cell stack, and wherein the resin part, at which the sacrificial electrode is located, is located on the inner side surface of the second end plate.

20 Claims, 13 Drawing Sheets

(56)  References Cited

U.S. PATENT DOCUMENTS

2021/0126274 A1*  4/2021  Heo ...................... H01M 8/248
2023/0369615 A1*  11/2023  Takehiro .......... H01M 8/04029

FOREIGN PATENT DOCUMENTS

| JP | 2016096033 A | 5/2016 |
|----|--------------|--------|
| KR | 19980001800 A | 3/1998 |
| KR | 20130104490 A | 9/2013 |
| KR | 20150069779 A | 6/2015 |

* cited by examiner

FIG. 3B

FUEL CELL

CROSS-REFERENCE TO RELATED APPLICATIONS

This application claims the benefit of Korean Application No. 10-2022-0080744, filed on Jun. 30, 2022, which application is hereby incorporated herein by reference.

TECHNICAL FIELD

The present invention relates to a fuel cell.

BACKGROUND

In general, a fuel cell includes a cell stack including a plurality of stacked unit cells, each being configured to generate electricity by receiving air on one side and hydrogen on the other side relative to a polymer electrolyte membrane.

In theory, there is little ionic conductivity of coolant inside the cell stack. However, as the cell stack generates power, ions are eluted from components such as a separator and the electrical conductivity increases, thereby accelerating corrosion and causing a vicious cycle of ion elution. Therefore, there is ongoing research to prevent such corrosion.

SUMMARY

Embodiments provide a fuel cell capable of preventing corrosion on a high potential cell side.

Embodiments provide a fuel cell including a cell stack in which a plurality of unit cells is stacked in a first direction; first and second end plates respectively are disposed at both side ends of the cell stack and having a form in which a resin part envelopes a metallic insert; and a sacrificial electrode is disposed at the resin part of the second end plate adjacent to a cell having the highest potential among the unit cells, of the first and second end plates.

The cell having the highest potential among the unit cells may be the last cell.

The second end plate may include a coolant inlet into which coolant flows in the cell stack and having the resin part disposed thereat; and a coolant outlet from which coolant discharged from the cell stack flows out and having the resin part disposed thereat. The sacrificial electrode may be disposed in the resin part of at least one of the coolant inlet or the coolant outlet.

The resin part of the coolant inlet may include a plurality of inner surfaces forming a flow path through which the coolant passes, and the sacrificial electrode may be fixedly disposed on at least one of the inner surfaces.

The resin part of the coolant outlet may include a plurality of inner surfaces forming a flow path through which the coolant passes, and the sacrificial electrode may be fixedly disposed on at least one of the inner surfaces.

The fuel cell may further include a guide part disposed on the inner surface on which the sacrificial electrode is disposed among the inner surfaces and protruding in a second direction intersecting the first direction. The sacrificial electrode may include a guide receiving groove configured to receive therein the guide part.

The second end plate may include an inner side surface facing the cell stack; and an outer side surface positioned opposite to the inner side surface in the first direction.

The resin part at which the sacrificial electrode is disposed may include a seating groove formed on the inner surface, the sacrificial electrode being seated on the seating groove; an electrode fixing part configured to fix the sacrificial electrode seated on the seating groove; and a stopper adjacent to the inner side surface of the second end plate and protruding in a direction intersecting the first direction to prevent the sacrificial electrode from escaping from the seating groove in the first direction.

The sacrificial electrode may include a first coupling part, and the resin part of at least one of the coolant inlet or the coolant outlet may further include a second coupling part to be clamped to the first coupling part.

The first coupling part may include a bolt, and the second coupling part may include a thread groove to be coupled to the bolt through screwing.

The electrode fixing part may include a fixing receiving groove formed around the flow path of the outer side surface of the second end plate; and a locking protrusion protruding in the first direction within the fixing receiving groove. The sacrificial electrode may include a body configured to be received in the seating groove of the inner surface and having one end facing the stopper; and an extension extending by being bent in a direction intersecting the first direction from the other end opposite to the one end of the body, and configured to be coupled to the locking protrusion to fix the body to the inner surface and configured to be received in the fixing receiving groove together with the locking protrusion.

The fuel cell may further include a cover having a hollow configured to expose the flow path while covering the sacrificial electrode. The resin part of at least one of the coolant inlet or the coolant outlet may further include a cover receiving groove formed around the flow path on the outer side surface of the second end plate and configured to receive therein the cover; and a cover fixing part configured to fix the cover to the resin part.

The cover may cover the extension of the sacrificial electrode, and an outer surface of the cover and the outer side surface of the second end plate may form the same horizontal plane.

The cover may be light-transmissive or semi-transmissive.

The sacrificial electrode may have a structure coupled to the inner surface through an injection molding process.

According to various embodiments described herein, a fuel cell may include a sacrificial electrode in at least one of a coolant inlet or a coolant outlet, that is, a flow path through which coolant flows, in a second end plate disposed adjacent to a last cell having the highest potential, to prevent corrosion on the last cell side, and may use at least one of a seating groove, an electrode fixing part, a stopper, or a cover to firmly fix the sacrificial electrode to a resin part.

BRIEF DESCRIPTION OF THE DRAWINGS

FIG. 3B is an exploded perspective view of a fuel cell according to an embodiment;

DETAILED DESCRIPTION OF ILLUSTRATIVE EMBODIMENTS

Hereinafter, some example embodiments will be described in detail with reference to the accompanying drawings. However, various alterations and modifications may be made to the embodiments. Here, the embodiments are not construed as limited to the disclosure and should be understood to include all changes, equivalents, and replacements within the idea and the technical scope of the disclosure.

Throughout the disclosure, when an element, such as a layer, region, or substrate, is described as being "on," "under," "connected to," or "coupled to" another element, it may be directly "on," "under," "connected to," or "coupled to" the other element, or there may be one or more other elements intervening therebetween.

In contrast, when an element is described as being "directly on," "directly connected to," or "directly coupled to" another element, there may be no other elements intervening therebetween.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

Hereinafter, a fuel cell (e.g., a fuel cell 100) according to an embodiment will be described with reference to the accompanying drawings. Although the fuel cell 100 will be described using a Cartesian coordinate system (x-axis, y-axis, and z-axis) for convenience, it may also be described using other coordinate systems. In addition, according to the Cartesian coordinate system, the x-axis, the y-axis, and the z-axis are orthogonal to each other, but embodiments are not limited thereto. That is, the x-axis, y-axis, and z-axis may intersect each other. For convenience of description, a +x-axis direction or −x-axis direction is referred to herein as a "first direction," a +y-axis direction or −y-axis direction is referred to herein as a "second direction," and a +z-axis direction or −z-axis direction is referred to herein as a "third direction."

Figure 1A:
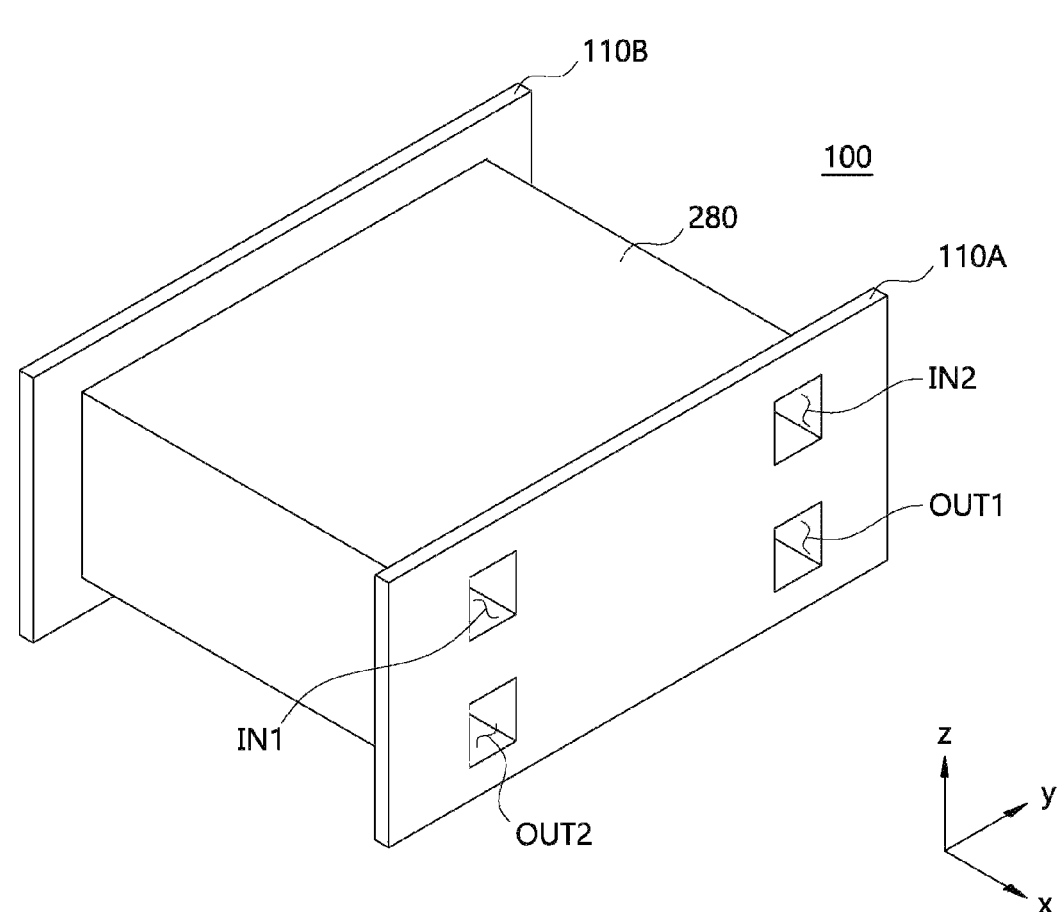
FIGS. 1A and 1B are perspective views of the exterior of a fuel cell according to an embodiment.
Figure 1B:
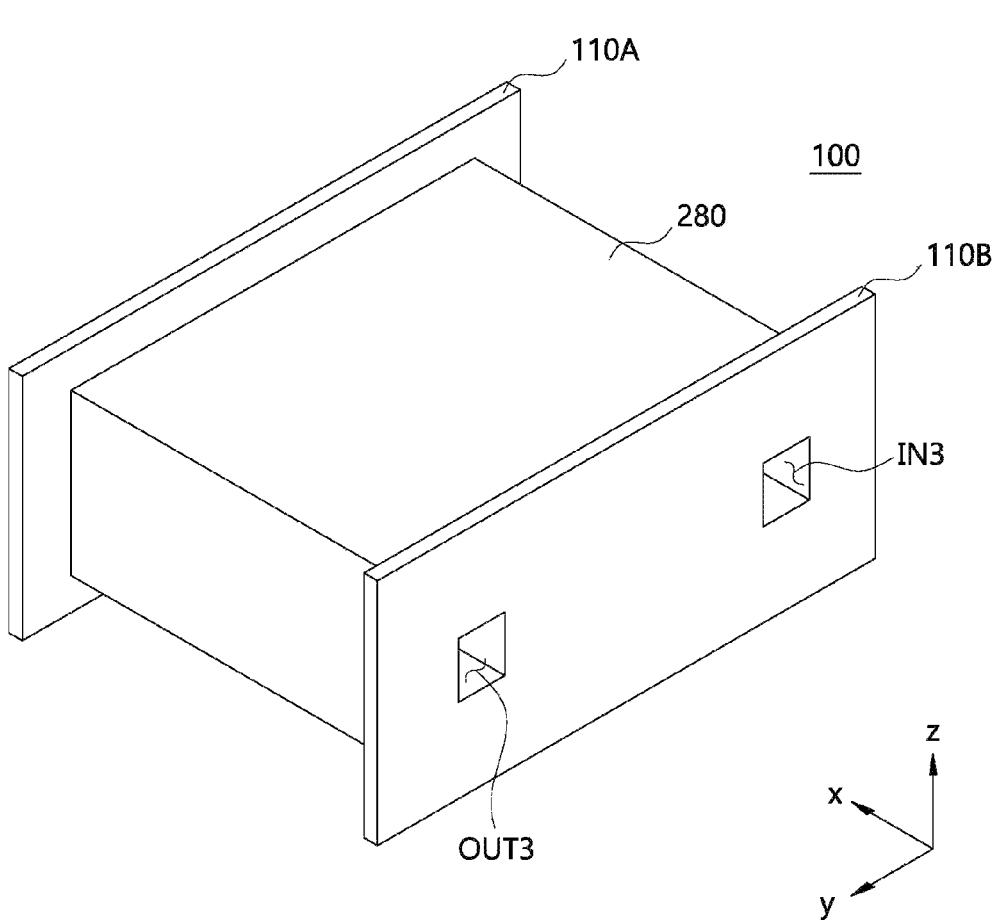
Figure 2:
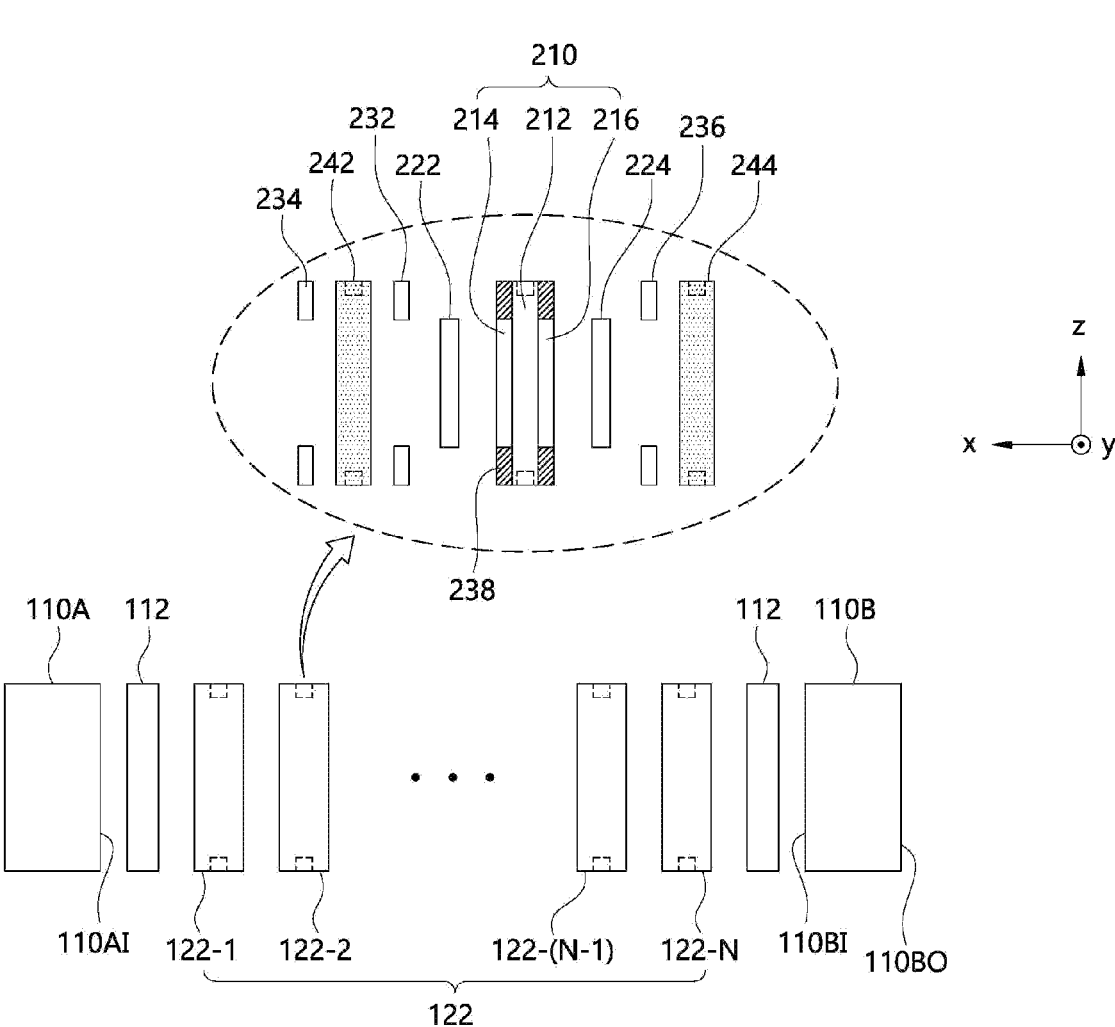
FIG. 2 is a cross-sectional view of a cell stack included in a fuel cell according to an embodiment.

FIGS. 1A and 1B are perspective views of the exterior of a fuel cell 100 according to an embodiment, and FIG. 2 is a cross-sectional view of a cell stack (or a power generation module) 122 included in the fuel cell 100 according to an embodiment. An enclosure 280 illustrated in FIGS. 1A and 1B is omitted from FIG. 2.

The fuel cell 100 may be, for example, a polymer electrolyte membrane fuel cell or proton exchange membrane fuel cell (PEMFC), which is the most studied as a power source for driving a vehicle. However, the embodiment is not limited to a specific form of the fuel cell 100.

The fuel cell 100 may include an end plate (or a pressing plate or compression plate) (e.g., a first end plate 110A and a second end plate 110B as illustrated), a current collector (or, a current collector plate) 112, a cell stack 122, and an enclosure 280.

Although not shown, plate-shaped dummy cells corresponding to an outer shape of a unit cell may be arranged between both ends of the cell stack 122 and the end plates.

The enclosure 280 shown in FIGS. 1A and 1B may be clamped with the first and second end plates 110A and 110B, and surround at least a portion of the side of the cell stack 122 disposed between the end plates 110A and 110B. The enclosure 280 may serve to clamp a plurality of unit cells in a first direction, together with the end plates 110A and 110B. That is, a clamping pressure of the cell stack 122 may be maintained by the end plates 110A and 110B having a rigid body structure and the enclosure 280. Metallic inserts of the first and second end plates 110A and 110B may be highly rigid to withstand an internal surface pressure and may be implemented by machining a metal material. To this end, each of the first and second end plates 110A and 110B may be provided in a form in which the metallic insert is enveloped by a resin part (e.g., a plastic injection product). For example, the first and second end plates 110A and 110B may each be formed by combining a plurality of plates, but the embodiment is not limited to a specific form of the first and second end plates 110A and 110B.

However, it is also possible to maintain the clamping pressure of the cell stack 122 without using the enclosure 280, and the embodiment is not limited to a specific form for maintaining the clamping pressure.

The end plate may be arranged on at least one of both ends of the cell stack 122 to support and fix the unit cells. For example, the first end plate 110A may be arranged at one end of both ends of the cell stack 122, and the second end plate 110B may be arranged at the other end of both ends of the cell stack 122.

The fuel cell 100 may include a plurality of manifolds M. The manifolds may include a first inlet communication part (or a first inlet manifold) IN1, a second inlet communication part (or a second inlet manifold) IN2, a third inlet communication part (or a third inlet manifold) IN3, a first outlet communication part (or a first outlet manifold) OUT1, a second outlet communication part (or a second outlet manifold) OUT2, and a third outlet communication part (or a third outlet manifold) OUT3.

One of the first and second inlet communication parts IN1 and IN2 may correspond to a hydrogen inlet for introducing hydrogen, which is a reactant gas, from the outside into the cell stack 122, and the other may correspond to an oxygen inlet for introducing oxygen, which is a reactant gas, from the outside into the cell stack 122. In addition, one of the first and second outlet communication parts OUT1 and OUT2 may correspond to a hydrogen outlet for discharging hydrogen, which is a reactant gas, and condensate water to the outside of the cell stack 122, and the other may correspond to an oxygen outlet for discharging oxygen, which is a reactant gas, and condensate water to the outside of the cell stack 122.

For example, the first inlet communication part IN1 may correspond to the oxygen inlet, and the second inlet communication part IN2 may correspond to the hydrogen inlet. The first outlet communication part OUT1 may correspond to the oxygen outlet, and the second outlet communication part OUT2 may correspond to the hydrogen outlet.

In addition, the third inlet communication part IN3 may correspond to a coolant inlet for introducing a cooling medium (e.g., coolant) from the outside, and the third outlet communication part OUT3 may correspond to a coolant outlet for discharging the cooling medium to the outside.

The first and second outlet communication parts OUT1 and OUT2 may be disposed below the first and second inlet communication parts IN1 and IN2. The first inlet communication part IN1 and the first outlet communication part OUT1 may be positioned in a diagonal direction to each other, and the second inlet communication part IN2 and the second outlet communication part OUT2 may be positioned in a diagonal direction to each other. When the first and second inlet communication parts IN1 and IN2 and the first and second outlet communication parts OUT1 and OUT2 are disposed in such a way, the condensate water may be discharged from the lower portions of the unit cells included in the cell stack 122 or may remain in the lower portions thereof, under the influence of gravity.

According to an embodiment, the first and second inlet communication parts IN1 and IN2 and the first and second outlet communication parts OUT1 and OUT2 may be included in any one of the first and second end plates 110A and 110B (e.g., the first end plate 110A as shown in FIG. 1A), and the third inlet communication part IN3 and the third outlet communication part OUT3 may be included in the other of the first and second end plates 110A and 110B (e.g., the second end plate 110B as shown in FIG. 1B).

Referring to FIG. 2, the cell stack 122 may include a plurality of unit cells 122-1 to 122-N stacked in a first direction. Here, N denotes a positive integer greater than or equal to 1 and may be tens to hundreds. N may be determined according to the intensity of power to be supplied from the fuel cell 100 to a load. Here, "load" may refer to a portion that requires electric power in a vehicle for which a fuel cell is used.

Each unit cell 122-$n$ may include a membrane electrode assembly (MEA) 210, gas diffusion layers (GDLs) 222 and 224 (e.g., a first GDL 222 and a second GDL 224), gaskets 232, 234, and 236, and separators 242 and 244 (or bipolar plates or separation plates)(e.g., a first separator 242 and a second separator 244). Here, $1 \leq n \leq N$.

The MEA 210 may have a structure in which a catalyst electrode layer in which an electrochemical reaction occurs is attached to each of both sides of an electrolyte membrane through which hydrogen ions move. Specifically, the MEA 210 may include a polymer electrolyte membrane PEM 212 (or a proton exchange membrane), a fuel electrode 214 (or a hydrogen electrode or an anode), and an air electrode 216 (or an oxygen electrode or a cathode). In addition, the MEA 210 may further include a sub-gasket 238.

The PEM 212 may be disposed between the fuel electrode 214 and the air electrode 216.

In the fuel cell 100, hydrogen as a fuel may be supplied to the fuel electrode 214 through the first separator 242, and air containing oxygen as an oxidizer may be supplied to the air electrode 216 through the second separator 244.

Hydrogen supplied to the fuel electrode 214 may be decomposed, by catalyst, into hydrogen ions (protons, H+) and electrons (e−). The hydrogen ions alone may be selectively transferred to the air electrode 216 through the PEM 212, and at the same time, the electrons may be transferred to the air electrode 216 through the GDLs 222 and 224 and the separators 242 and 244 which are conductors. For realizing the foregoing operation, a catalyst layer may be applied to each of the fuel electrode 214 and the air electrode 216. The movement of the electrons described above causes the electrons to flow through an external wire, thus generating current That is, an electrochemical reaction between hydrogen that is fuel and oxygen contained in the air may allow the fuel cell 100 to generate electric power.

In the air electrode 216, the hydrogen ions supplied through the PEM 212 and the electrons transferred through the separators 242 and 244 meet oxygen in the air supplied to the air electrode 216, thus causing a reaction that generates water (hereinafter referred to as "condensate water" or "product water"). The condensate water generated in the air electrode 216 may penetrate the PEM 212 to be transferred to the fuel electrode 214.

In some cases, the fuel electrode 214 may be referred to as an anode and the air electrode 216 may be referred to as a cathode. Conversely, the fuel electrode 214 may also be referred to as a cathode and the air electrode 216 may also be referred to as an anode.

The GDLs 222 and 224 may evenly distribute hydrogen and oxygen, which are reactant gases, and transfer the generated electrical energy. To this end, the GDLs 222 and 224 may be respectively disposed on both sides of the MEA 210. For example, the first GDL 222 may be disposed on the left side of the fuel electrode 214, and the second GDL 224 may be disposed on the right side of the air electrode 216.

The first GDL 222 may diffuse and evenly distribute hydrogen, which is a reactant gas supplied through the first separator 242, and may have electrical conductivity.

The second GDL 224 may diffuse and evenly distribute air, which is a reactant gas supplied through the second separator 244, and may have electrical conductivity.

Each of the first and second GDLs 222 and 224 may be a microporous layer in which fine carbon fibers are combined, but the embodiment is not limited to a specific form of the first and second GDLs 222 and 224.

The gaskets 232, 234, and 236 may maintain airtightness and proper clamping pressure of the reactant gases and the coolant, disperse stress when stacking the separators 242 and 244, and seal flow paths independently.

The separators 242 and 244 may move the reactant gases and the cooling medium and separate each of the unit cells from the other unit cells. In addition, the separators 242 and 244 may structurally support the MEA 210 and the GDLs 222 and 224, and collect the generated current and transfer it to a current collector 112.

The separators 242 and 244 may be disposed outside of the GDLs 222 and 224, respectively. For example, the first separator 242 may be disposed on the left side of the first GDL 222, and the second separator 244 may be disposed on the right side of the second GDL 224.

The first separator 242 may serve to supply hydrogen, which is a reactant gas, to the fuel electrode 214 through the first GDL 222. To this end, the first separator 242 may include an anode plate (AP) having a channel (i.e., a path or a flow path) through which hydrogen may flow.

The second separator 244 may serve to supply air, which is a reactant gas, to the air electrode 216 through the second GDL 224. To this end, the second separator 244 may include a cathode plate (CP) having a channel through which air containing oxygen may flow. In addition, each of the first and second separators 242 and 244 may form a channel through which the cooling medium may flow.

In addition, the separators 242 and 244 may be formed of a graphite-based, composite graphite-based, or metal-based material, but the embodiment is not limited to a specific material of the separators 242 and 244.

For example, each of the first and second separators 242 and 244 may include the first to third inlet communication parts IN1, IN2, and IN3, and the first to third outlet communication parts OUT1, OUT2, and OUT3, or a portion thereof.

That is, the reactant gases required for the MEA 210 may be introduced through the first and second inlet communication parts IN1 and IN2, and gas or liquid in which the reactant gases humidified and supplied to the cell and the condensate water generated in the cell are combined may be discharged to the outside of the fuel cell 100 through the first and second outlet communication parts OUT1 and OUT2.

The current collector 112 may be disposed between the cell stack 122, and inner side surfaces 110AI and 110BI of the first and second end plates 110A and 110B facing the cell stack 122.

The current collector 112 may collect electrical energy generated by the flow of electrons in the cell stack 122 and supply it to a load of a vehicle in which the fuel cell 100 is used. For example, the current collector 112 may be formed of a metal plate that is an electrically conductive material, and may be electrically connected to the cell stack 122.

Meanwhile, corrosion may occur in a separator of a cell having a high potential among the cells due to a potential difference during power generation of a cell stack (e.g., the cell stack 122). Therefore, according to an embodiment, a fuel cell may include a sacrificial electrode to suppress such corrosion.

Hereinafter, according to an embodiment, a fuel cell including a sacrificial electrode will be described with reference to the accompanying drawings.

Figure 3A:
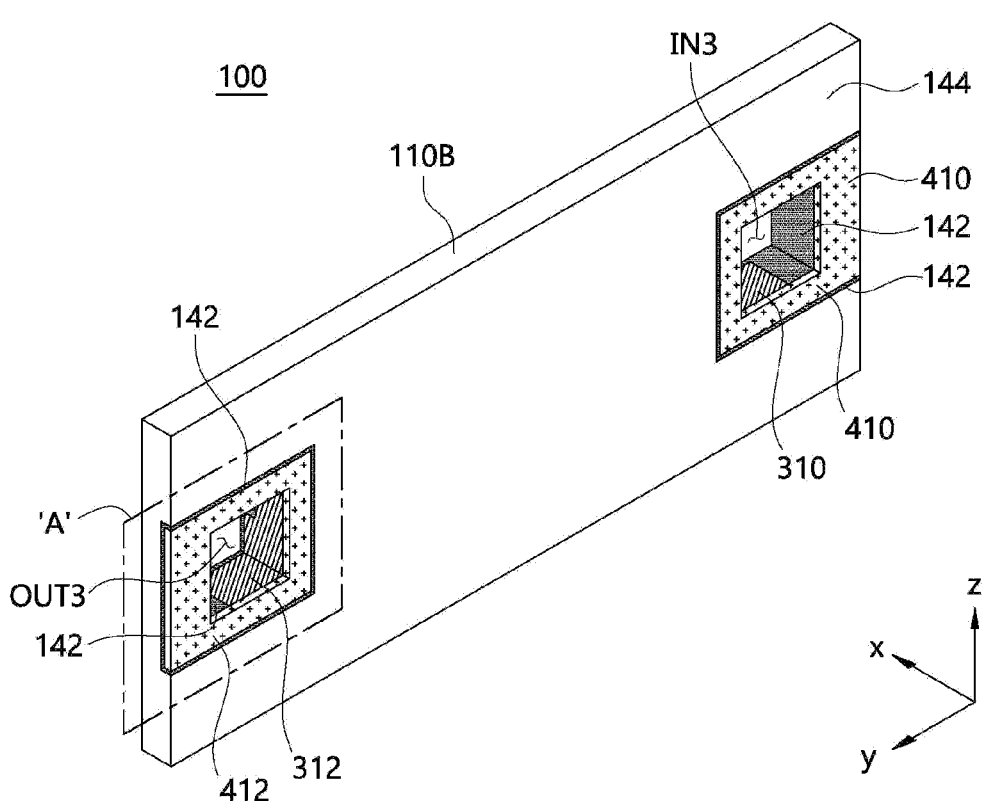
FIG. 3A is a combined perspective view of a fuel cell according to an embodiment.
Figure 3B:
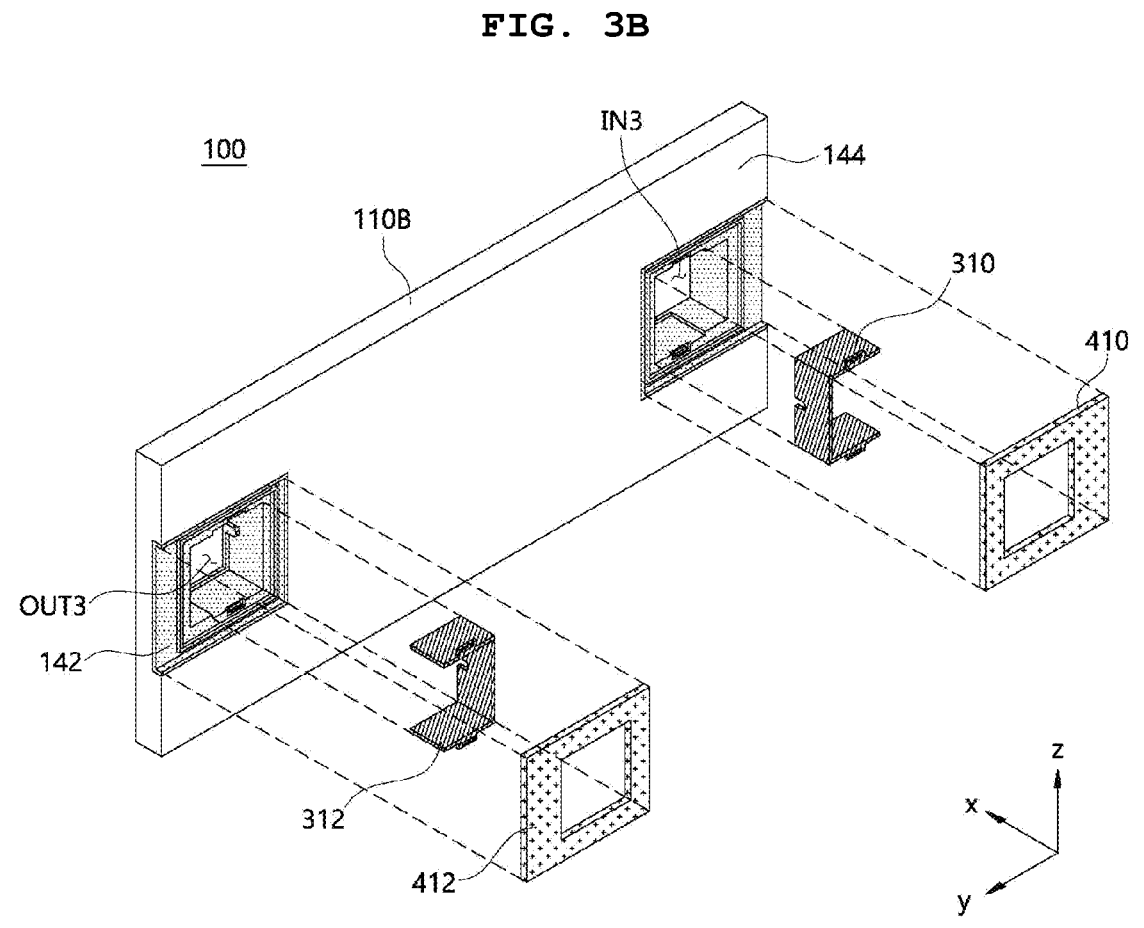
Figure 3C:
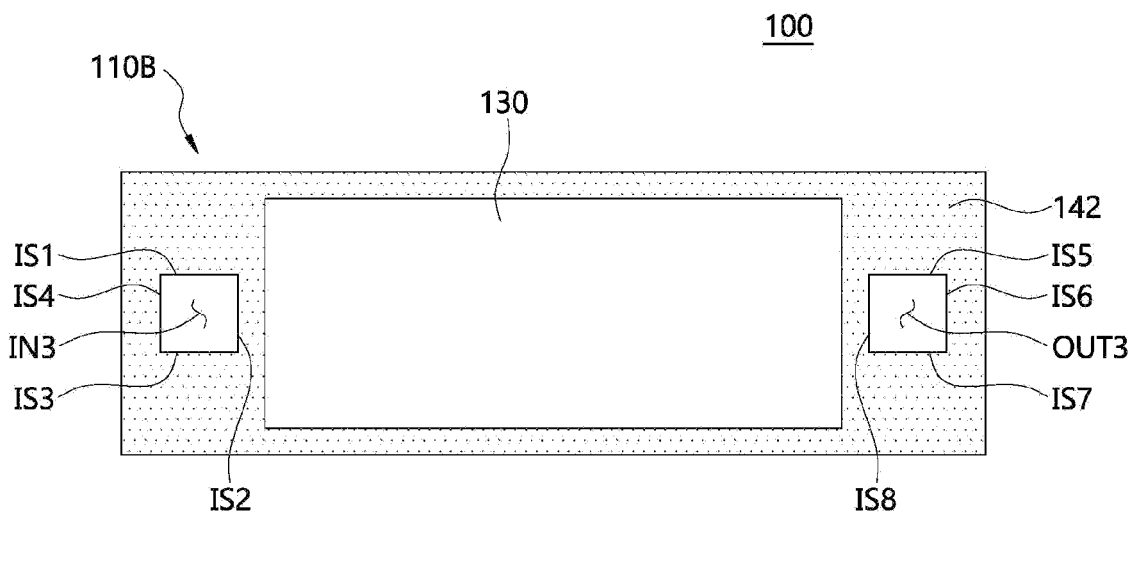
FIG. 3C is a front view of a fuel cell according to an embodiment.
Figure 3C:
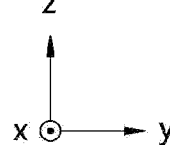
Figure 3D:
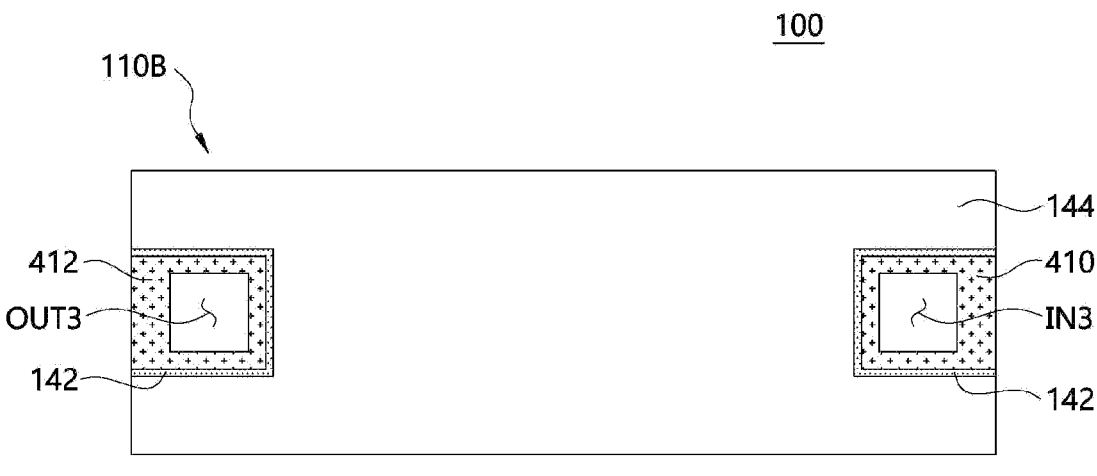
FIG. 3D is a rear view of a fuel cell according to an embodiment.
Figure 3D:
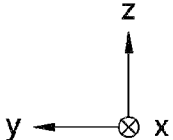

FIG. 3A is a perspective view showing the assembled state of the fuel cell 100 according to an embodiment, FIG. 3B is an exploded perspective view of the fuel cell 100 according to an embodiment, FIG. 3C is a front view of the fuel cell 100 according to an embodiment, and FIG. 3D is a rear view of the fuel cell 100 according to an embodiment.

A sacrificial electrode may be disposed on an end plate adjacent to a cell having the highest potential among a plurality of unit cells (e.g., 122-1 to 122-N), of first and second end plates (e.g., 110A and 110B). The sacrificial electrode may be formed of a metal, such as, for example, Steel Use Stainless (SUS).

The cell having the highest potential among the unit cells 122-1 to 122-N may be an Nth cell 122-N. In this example, sacrificial electrodes 310 and 312 may be disposed on the second end plate 110B as shown in FIGS. 3A to 3D. For convenience of description, FIGS. 3A to 3D illustrate only the side of the second end plate 110B on which the sacrificial electrodes 310 and 312 are disposed.

The second end plate 110B shown in FIGS. 3A to 3D may correspond to an embodiment of the second end plate 110B shown in FIGS. 1A, 1B, and 2. The second end plate 110B may be provided in a form in which a metallic insert 144 is surrounded by a resin part 142 (e.g., a plastic injection product).

The resin part 142 may be disposed on a portion excluding a reaction surface 130 from the inner side surface 110BI of the second end plate 110B as shown in FIG. 3C, and may be disposed at a coolant inlet IN3 and a coolant outlet OUT3 as shown in FIGS. 3A to 3D. The coolant inlet IN3 and the coolant outlet OUT3 may be covered with the resin part 142 to secure insulation performance.

As long as the resin part 142 of the metallic insert 144 and the resin part 142 shown in FIGS. 3A to 3D is disposed at the coolant outlet OUT3 and the coolant inlet IN3, the embodiment is not limited to a specific arrangement of each of the metallic insert 144 and the resin part 142.

As described above, in the fuel cell 100 according to an embodiment, the coolant inlet IN3 may be a portion through which coolant flows into the cell stack 122, and the coolant outlet OUT3 may be a portion through which the coolant is discharged from the cell stack 122. The resin part 142 may be disposed at each of the coolant inlet IN3 and the coolant outlet OUT3, as shown in the drawings.

According to an embodiment, the sacrificial electrode may be disposed at the resin part 142 of at least one of the coolant inlet IN3 or the coolant outlet OUT3.

For example, as shown in FIGS. 3A to 3D, the sacrificial electrode 310 may be disposed at the coolant inlet IN3, and the sacrificial electrode 312 may be disposed at the coolant outlet OUT3.

Alternatively, unlike what is shown in the drawings, the sacrificial electrode 310 may be disposed at the coolant inlet IN3, but the sacrificial electrode 312 may not be disposed at the coolant outlet OUT3.

Alternatively, unlike what is shown in the drawings, the sacrificial electrode 310 may not be disposed at the coolant inlet IN3, but the sacrificial electrode 312 may be disposed at the coolant outlet OUT3.

Hereinafter, according to embodiments, various shapes of the sacrificial electrodes 310 and 312 will be described with reference to the accompanying drawings.

FIGS. 4A to 4F are perspective views of various examples of a sacrificial electrode according to an embodiment.

Referring to FIG. 3C, the resin part 142 of the coolant inlet IN3 may include a plurality of inner surfaces, for example, first to fourth inner surfaces IS1 to IS4, which form a flow path through which coolant passes. In this case, the sacrificial electrode may be fixedly disposed on at least one of the first to fourth inner surfaces IS1 to IS4.

In addition, the resin part 142 of the coolant outlet OUT3 may include a plurality of inner surfaces, for example, fifth to eighth inner surfaces IS5 to IN8, which form a flow path through which coolant passes. In this case, the sacrificial electrode may be fixedly disposed on at least one of the fifth to eighth inner surfaces IS5 to IS8.

Figure 4A:
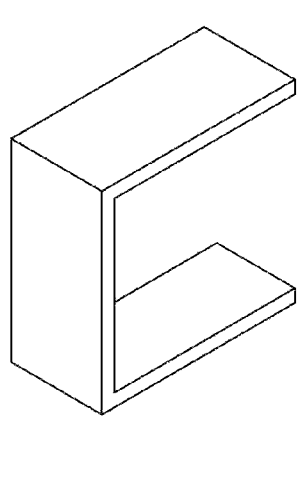
FIGS. 4A to 4F are perspective views of various examples of a sacrificial electrode according to an embodiment.
Figure 4A:
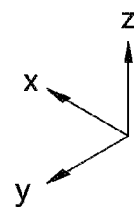
Figure 4B:
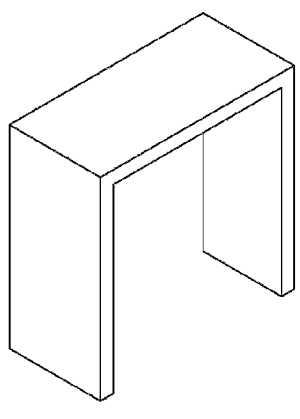
Figure 4B:
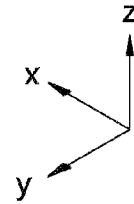
Figure 4C:
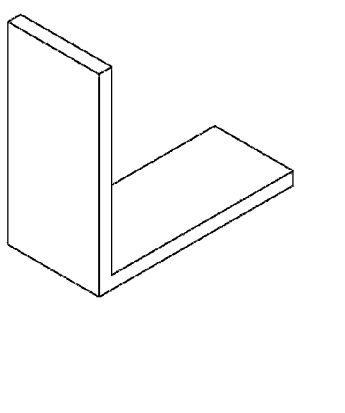
Figure 4C:
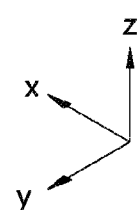
Figure 4D:
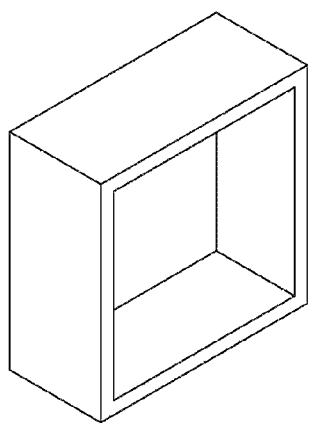
Figure 4D:
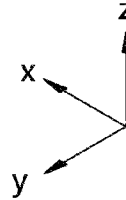
Figure 4E:
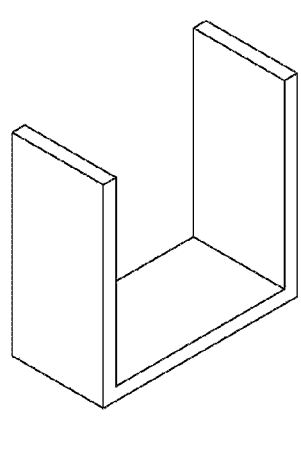
Figure 4E:
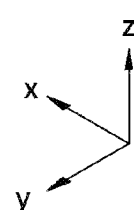

According to an embodiment, as shown in FIGS. 3A to 3D, and 4A, 4B, and 4E, one sacrificial electrode 310 may be disposed on three inner surfaces IS1, IS2, and IS3, among the first to fourth inner surfaces IS1 to IS4. In addition, the other sacrificial electrodes 312 may also be disposed on three inner surfaces IS5, IS7, and IS8 among the fifth to eighth inner surfaces IS5 to IS8. In this case, the sacrificial electrodes 310 and 312 may each be provided in a C shape (⊂) or an inverted C shape (⊃) as shown in FIG. 3B or 4A, or in an inverted U shape (∩) or a U shape (∪) as shown in FIG. 4B or 4E.

According to another embodiment, the sacrificial electrode may be disposed on all of the first to fourth inner surfaces IS1 to IS4 or all of the fifth to eighth inner surfaces IS5 to IS8. For example, as shown in FIG. 4D, the sacrificial electrode may be provided in a quadrangular shape (□).

Figure 4F:
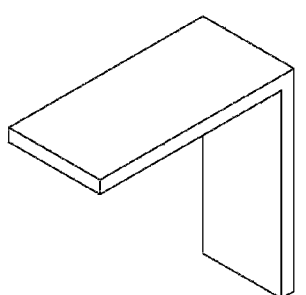
Figure 4F:
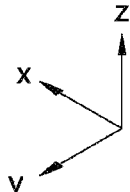

According to still another embodiment, the sacrificial electrode may be disposed on two inner surfaces of the first to fourth inner surfaces IS1 to IS4 or two inner surfaces of the fifth to eighth inner surfaces IS5 to IS8. For example, as shown in FIGS. 4C and 4F, the sacrificial electrode may be provided in an L shape or an inverted L shape (¬).

Hereinafter, a method of manufacturing the fuel cell 100 according to an embodiment will be described with reference to the accompanying drawings.

Figure 5A:
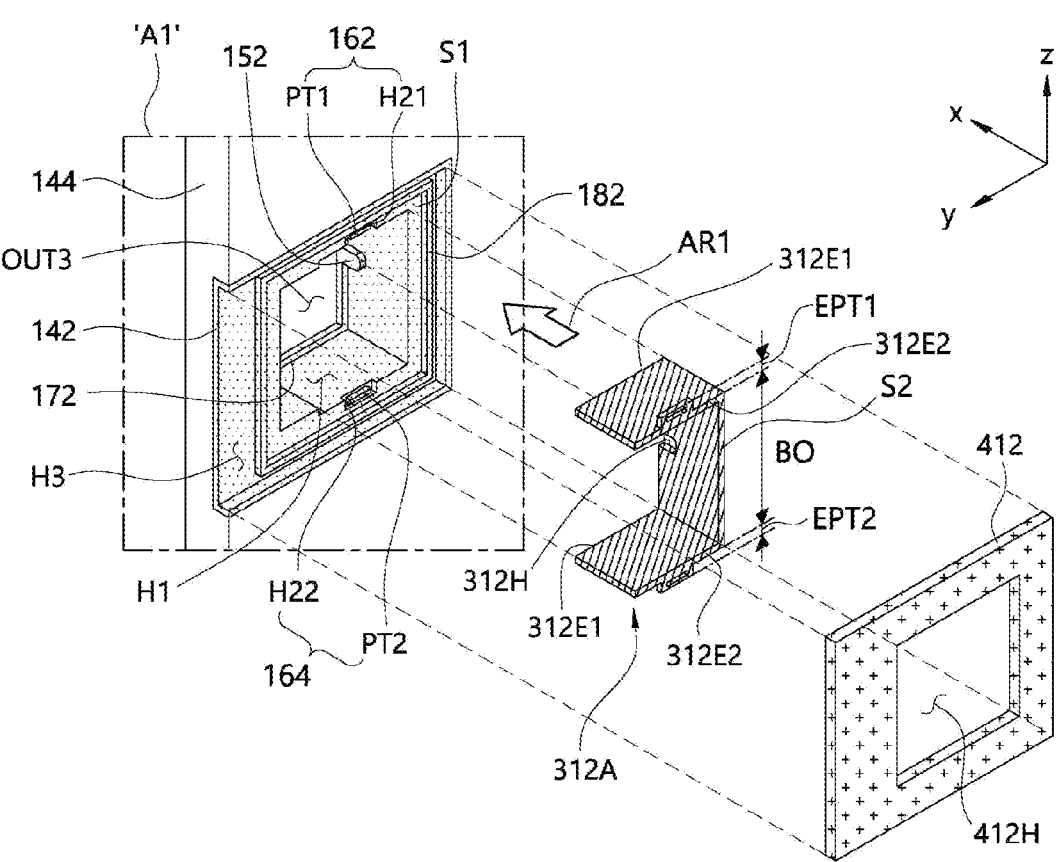
FIG. 5A is an exploded perspective view of a portion A illustrated in FIG. 3A according to an embodiment.
Figure 5B:
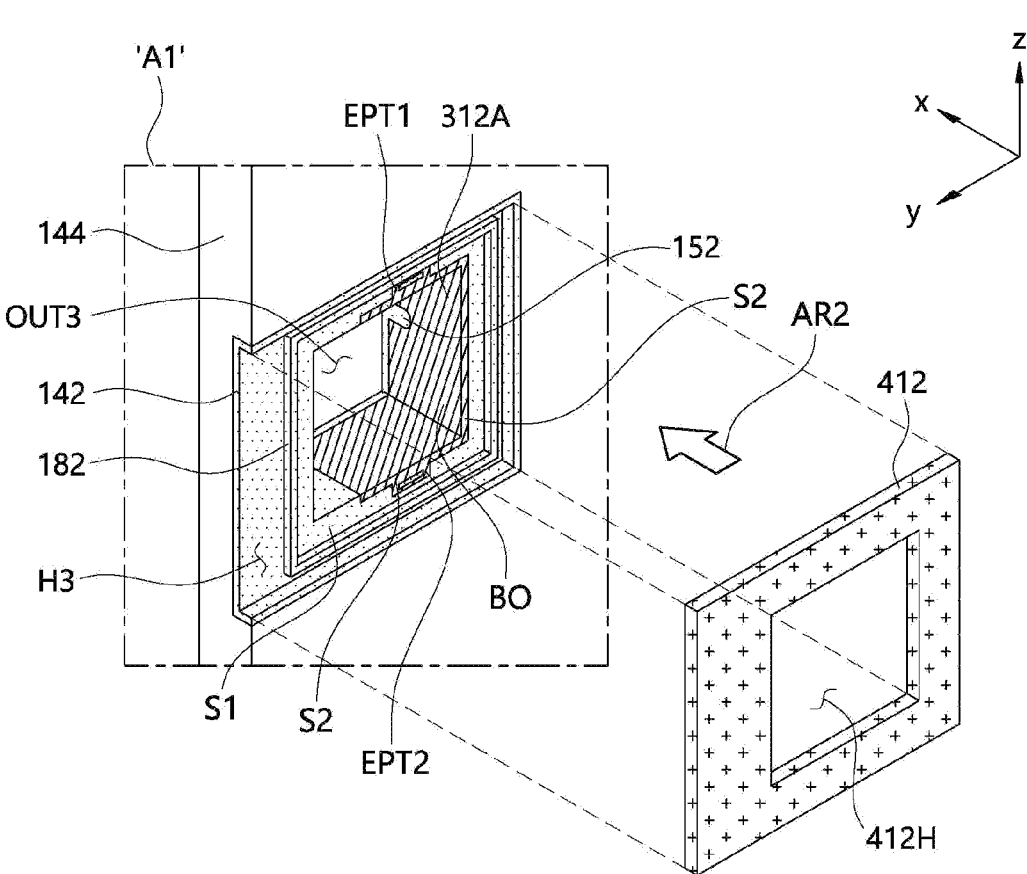
FIG. 5B is a partially combined perspective view of the portion A illustrated in FIG. 3A according to an embodiment.
Figure 5C:
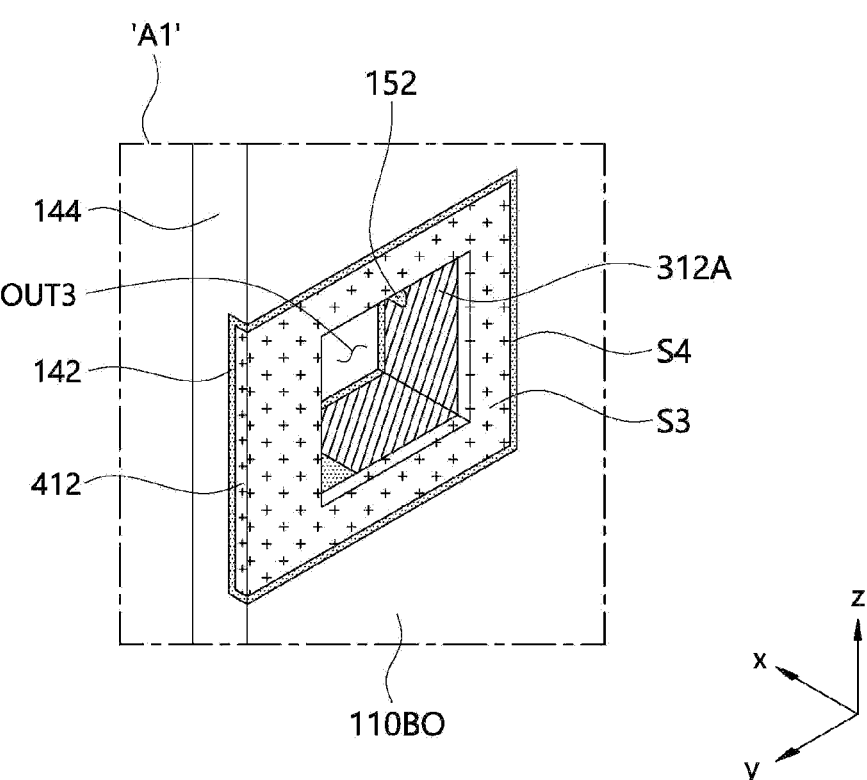
FIG. 5C is a combined perspective view of the portion A illustrated in FIG. 3A according to an embodiment.

FIG. 5A is an exploded perspective view of showing an embodiment A1 of a portion A illustrated in FIG. 3A according to an embodiment, FIG. 5B is a partially combined perspective view of showing the embodiment A1 of the portion A illustrated in FIG. 3A according to an embodiment, and FIG. 5C is a combined perspective view of showing the embodiment A1 of the portion A illustrated in FIG. 3A.

A sacrificial electrode 312A shown in FIGS. 5A to 5C may correspond to an embodiment of the sacrificial electrode 312 shown in FIG. 3B.

First, by moving the sacrificial electrode 312A in a direction indicated by an arrow AR1 shown in FIG. 5A, the sacrificial electrode 312A may be coupled to the resin part 142 of the coolant outlet OUT3 as shown in FIG. 5B.

Subsequently, by moving a cover 412 to be described later in a direction indicated by an arrow AR2 shown in FIG. 5B, the cover 412 may be coupled to the resin part 142 of the coolant outlet OUT3 as shown in FIG. 5C.

As shown in FIGS. 5A to 5C, the sacrificial electrode 310 may also be fixedly disposed on the resin part 142 side of the coolant inlet IN3.

Hereinafter, the sacrificial electrodes 310 and 312 and elements disposed around the sacrificial electrodes 310 and 312 of the fuel cell boo according to the embodiment will be described in detail below. Although a configuration including the coolant outlet OUT3, the sacrificial electrode 312A fixedly disposed at the coolant outlet OUT3, and elements disposed therearound will be mainly described with reference to FIGS. 5A to 5C, the description may also be applied to a configuration including the coolant inlet IN3, the sacrificial electrode 310 fixedly disposed at the coolant inlet IN3, and elements disposed therearound.

Referring back to FIG. 2, the second end plate 110B may include an inner side surface 110BI facing the cell stack 122 and an outer side surface 110BO on the opposite side of the inner side surface 110BI in a first direction in which a plurality of unit cells 122-1 to 122-N are stacked, as described above.

According to an embodiment, the fuel cell 100 may include a guide part 152, and the sacrificial electrode 312A may include a guide receiving groove 312H.

The guide part 152 may be disposed on an inner surface on which a sacrificial electrode is disposed among a plurality of inner surfaces IS1 to IS4 or IS5 to IS8, and may be provided in a shape that protrudes in a second direction intersecting the first direction. The guide part 152 may be received in the guide receiving groove 312H formed in the sacrificial electrode 312A.

When the sacrificial electrode 312A is moving in toward the resin part 142 of the coolant outlet OUT3 in the second end plate 110B in the first direction, the guide part 152 may slide to be received in the guide receiving groove 312H, and the guide part 152 and the guide receiving groove 312H may thereby guide the sacrificial electrode 312A to be coupled to the coolant outlet OUT3.

In addition, the resin part 142 in which the sacrificial electrode 312A is disposed may include at least one of a seating groove H1, a stopper 172, or electrode fixing parts 162 and 164.

The sacrificial electrode 312A may be seated on the seating groove H1 formed on an inner surface (e.g., IS5, IS7, and IS8) of the coolant outlet OUT3.

The stopper 172 may be adjacent to the inner side surface 110BI of the second end plate 110B and protrude in at least one of the second direction or a third direction intersecting the first direction, thereby preventing the sacrificial electrode 312A from escaping from the seating groove H1 in the first direction. When the stopper 172 is omitted, the sacrificial electrode 312A may escape from the seating portion H1 in the first direction (e.g., a +x-axis direction), and thus the stopper 172 may be provided to prevent such escape.

The electrode fixing pails 162 and 164 may serve to fix the sacrificial electrode 312A seated on the seating groove H1.

According to an embodiment, the electrode fixing pails 162 and 164 may include fixing receiving grooves H21 and H22 and locking protrusions PT1 and PT2.

The fixing receiving grooves H21 and H22 may be formed around a flow path that is the coolant outlet OUT3 on the outer side surface 110BO of the second end plate 110B.

The locking protrusions PT1 and PT2 may protrude in the first direction within the fixing receiving grooves H21 and H22.

In addition, the sacrificial electrode 312A may include a body BO and extensions EPT1 and EPT2.

The body BO may be received in the seating groove H1 inside the resin pall 142 and have one end 312E1 facing the stopper 172.

The extensions EPT1 and EPT2 may extend by being bent in at least one direction (e.g., a z-axis direction in FIGS. 5A and 5B) of the second direction or the third direction intersecting the first direction at the other end 312E2 opposite to the one end 312E1 of the body BO. The extensions EPT1 and EPT2 may be coupled to the locking protrusions PT1 and PT2 to fix the body BO to the seating groove H1 inside the resin pall 142.

As described above, as the extensions EPT1 and EPT2 and the locking protrusions PT1 and PT2 are coupled to each other, the sacrificial electrode 312A may be stably fixed to the inside of the resin part 142.

The locking protrusions PT1 and PT2 may be formed only inside the fixing receiving grooves H21 and H22, without protruding to the outside of the fixing receiving grooves H21 and H22, and the extensions EPT1 and EPT2 may be received in the fixing receiving grooves H21 and H22 even while being coupled to the locking protrusions PT1 and PT2. Therefore, as shown in FIG. 5B, after the extensions EPT1 and EPT2 are coupled to the locking protrusions PT1 and PT2, a surface S1 of the resin part 142 around the coolant outlet OUT3 and a side surface S2 of the extensions EPT1 and EPT2 may form the same horizontal plane with each other to be flat. When they form the flat horizontal plane in this way, the cover 412 to be described below that is disposed on the horizontal plane may be disposed to be flat.

Referring to FIGS. 5A to 5C, the cover 412 may include a hollow 412H that exposes the coolant outlet OUT3, which is a flow path, while covering the sacrificial electrode 312A.

To this end, the resin part 142 of the coolant outlet OUT3 may include a cover receiving groove H3 and a cover fixing part 182.

The cover receiving groove H3 may be formed around the flow path (e.g., OUT3) on the outer side surface 110BO of the second end plate 110B to receive the cover 412.

The cover fixing part 182 may serve to fix the cover 412 to the resin part 142.

The cover 410 may be provided in a plate shape.

For example, after the cover 412 is received in the cover receiving groove H3, the cover 412 may be fixed to the resin part 142 through fusion using a laser. In this case, the cover fixing part 182 may be a bead that leaks out of the cover receiving groove H3 as the fusion proceeds.

The cover (e.g., 410 and 412) may be formed of the same material as the resin part 142.

However, while the resin part 142 is not light-transmissive, the cover 412 may be light-transmissive or semi-transmissive such that, when the cover 412 is fixed to the resin part 142 through the fusion using a laser, the laser passes through the cover 412 to reach the cover fixing part 182.

In addition, as shown in FIG. 5C, when the cover 412 covers the extensions EPT1 and EPT2 of the sacrificial electrode 312A and the fixing receiving grooves H21 and H22, the outer surface S3 of the cover 412 and the outer side surface 110BO of the second end plate 110B may form the same horizontal plane to be flat. In this case, when one surface S4 of the resin part 142 is exposed between the outer surface S3 and the outer side surface 110BO, the one surface S4, the outer surface S3, and the outer side surface 110BO may form the same horizontal plane to be flat.

As described above, when the horizontal plane is formed, the flatness of the outer side surface 110BO of the second end plate 110B may be improved, and the tightness of a gasket (not shown) in contact with the coolant outlet OUT3 and the coolant inlet IN3 may be improved accordingly.

According to an embodiment, the fuel cell 100 may further include the covers 410 and 412 as described above, and thus the sacrificial electrodes 310 and 312 received on the seating groove H1 may be more firmly and fixedly disposed in the resin part 142.

According to an embodiment, in addition to the configuration described above, the sacrificial electrodes 310 and 312 may be coupled to the resin part 142 of at least one of the coolant inlet IN3 or the coolant outlet OUT3 in various forms.

A fuel cell according to another embodiment will be described with reference to the accompanying drawings.

Figure 6:
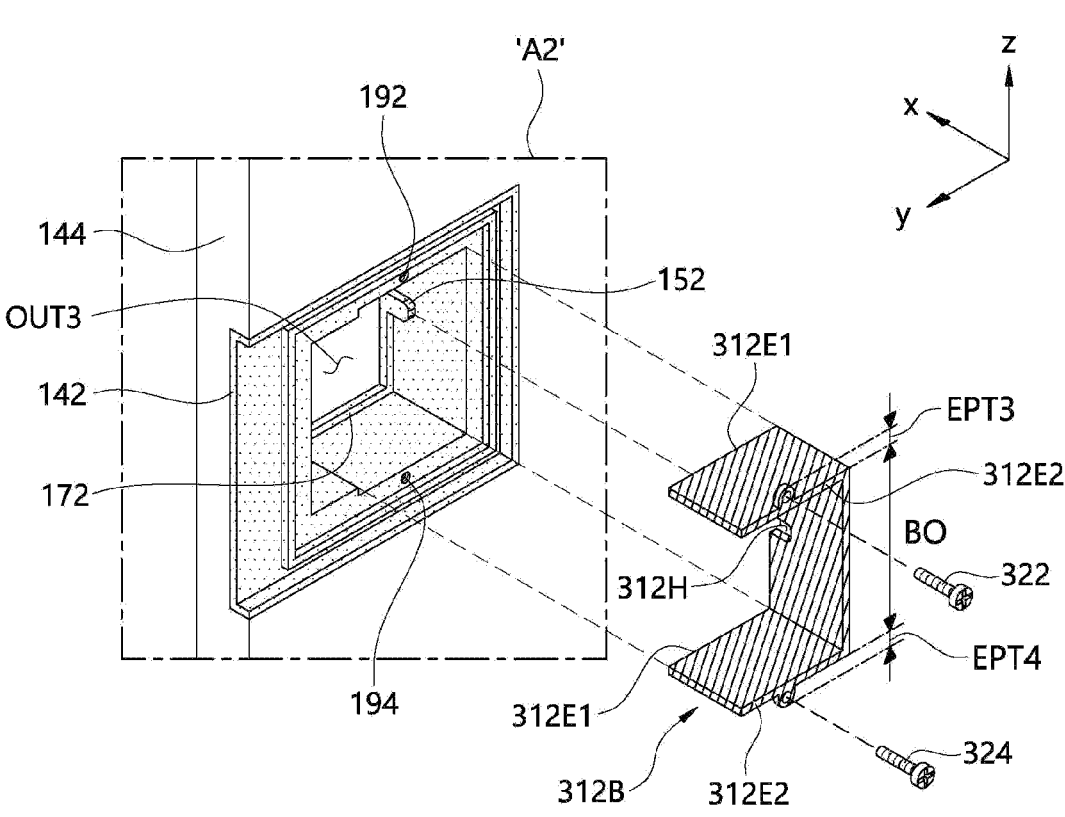
FIG. 6 is an exploded perspective view of the portion A illustrated in FIG. 3A according to another embodiment.

FIG. 6 is an exploded perspective view of a portion A2 corresponding to the portion A shown in FIG. 3A according to another embodiment.

A sacrificial electrode 312B shown in FIG. 6 may correspond to another embodiment of the sacrificial electrode 312 shown in FIG. 3A. In FIG. 6, the repeated description of the same elements provided above with reference to FIGS. 5A to 5C will be omitted for increased conciseness, using the same reference numerals.

The sacrificial electrode 312B may include a first coupling part, and the resin part 142 of at least one of the coolant inlet IN3 or the coolant outlet OUT3 may include second coupling parts 192 and 194 configured to be coupled to the first coupling part.

The first coupling part may include extensions EPT3 and EPT4 and bolts 322 and 324.

The extensions EPT3 and EPT4 may extend by being bent in at least one (e.g., a z-axis direction in FIG. 6) of the second direction or the third direction intersecting the first direction from the other end 312E2 opposite to one end 312E1 of the body BO. The extensions EPT3 and EPT4 may include through-holes through which the bolts 322 and 324 pass. In this case, the second coupling parts 192 and 194 may be thread grooves to be coupled to the bolts 322 and 324 through screwing. In this case, the thread grooves may extend from the resin part 142 to the metallic insert 144.

According to still another embodiment, the sacrificial electrodes 310 and 312 may be coupled to the inner surface of the resin part 142 of the second end plate 110B through an injection molding process. For example, a sacrificial electrode may be coupled to the inner surface of the resin part 142 through double injection molding process by which the resin part 142 is primarily injected into the metallic insert 144 and then the sacrificial electrode is then secondarily injected into the resin part 142.

The fuel cell in which the sacrificial electrode is coupled to the resin part 142 through screwing or double injection molding process as described above may also include at least one of the electrode fixing parts 162 and 164 or the covers 410 and 412.

In the case of the fuel cell 100 according to an embodiment, arranging the sacrificial electrodes 310 and 312 at a flow path (i.e., at least one of the coolant inlet IN3 or the coolant outlet OUT3) through which the coolant flows in the second end plate 110B disposed adjacent to a last cell having the highest potential may prevent the last cell side from being corroded.

In addition, in the case of the fuel cell 100 according to an embodiment, using at least one of the seating groove H1, the electrode fixing parts 162 and 164, the stopper 172, or the covers 410 and 412 may allow the sacrificial electrodes 310 and 312 to be firmly fixed to the resin part 142.

The foregoing embodiments may be combined with each other unless explicitly stated otherwise.

In addition, for a part omitted from the description of any one of the embodiments, the description of another embodiment may be applied unless otherwise stated.

Although some example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. A fuel cell comprising:
a cell stack comprising a plurality of unit cells stacked in a first direction;
first and second end plates disposed at both side ends of the cell stack, respectively, the second end plate comprising a resin part; and
a sacrificial electrode located at the resin part of the second end plate adjacent to a cell configured to provide a highest potential for the unit cells,
wherein the second end plate comprises an inner side surface facing the cell stack in the first direction,
wherein the resin part is located on the inner side surface of the second end plate,
wherein the second end plate comprises:
a coolant inlet configured to receive coolant for flowing in the cell stack,
a coolant outlet configured to discharge the coolant,
wherein the resin part comprises:
a first resin part located at the coolant inlet; and
a second resin part located at the coolant outlet, and
wherein the sacrificial electrode is disposed at the first resin part in the coolant inlet or at the second resin part in the coolant outlet or is disposed at both the first resin part in the coolant inlet and the second resin part in the coolant outlet.

2. The fuel cell of claim 1, wherein the cell having the highest potential among the unit cells is a last cell.

3. The fuel cell of claim 1, wherein the first resin part of the coolant inlet comprises a plurality of inner surfaces forming a flow path for the coolant, and wherein the sacrificial electrode is located on at least one inner surface.

4. The fuel cell of claim 3, further comprising:
a guide part disposed on the at least one inner surface on which the sacrificial electrode is disposed and protruding in a second direction intersecting the first direction,
wherein the sacrificial electrode comprises a guide receiving groove configured to receive therein the guide part.

5. The fuel cell of claim 3, wherein the second end plate further comprises an outer side surface opposite the inner side surface in the first direction.

6. The fuel cell of claim 5, wherein the first resin part of the coolant inlet comprises:

a seating groove on the at least one inner surface, the sacrificial electrode being seated on the seating groove;

an electrode fixing part configured to fix the sacrificial electrode seated on the seating groove; and a stopper adjacent to the inner side surface of the second end plate and protruding in a direction intersecting the first direction to prevent the sacrificial electrode from becoming loose from the seating groove in the first direction.

7. The fuel cell of claim 6, wherein the sacrificial electrode comprises a first coupling part, and wherein the first resin part of the coolant inlet further comprises a second coupling part clamped to the first coupling part.

8. The fuel cell of claim 7, wherein the first coupling part comprises a bolt, and wherein the second coupling part comprises a thread groove coupled to the bolt through screwing.

9. The fuel cell of claim 6, wherein the electrode fixing part comprises:

a fixing receiving groove formed around the flow path of the outer side surface of the second end plate, and a locking protrusion protruding in the first direction within the fixing receiving groove, and wherein the sacrificial electrode comprises:

a body configured to be received in the seating groove and having one end facing the stopper, and a bent extension extending in a direction intersecting the first direction from the other end opposite to the one end of the body, and configured to be coupled to the locking protrusion to fix the body to the at least one inner surface and configured to be received in the fixing receiving groove together with the locking protrusion.

10. The fuel cell of claim 6, further comprising:

a cover having an opening so that the flow path is exposed while the sacrificial electrode is covered, wherein the first resin part of the coolant inlet further comprises:

a cover receiving groove formed around the flow path on the outer side surface of the second end plate and configured to receive therein the cover, and a cover fixing part configured to fix the cover to the first resin part.

11. The fuel cell of claim 10, wherein the cover is configured to cover an extension of the sacrificial electrode, and wherein an outer surface of the cover and the outer side surface of the second end plate form the same horizontal plane.

12. The fuel cell of claim 10, wherein the cover has a light-transmissive property or a semi-transmissive property.

13. The fuel cell of claim 3, wherein the sacrificial electrode has a structure coupled to an inner surface through an injection molding process.

14. The fuel cell of claim 1, wherein the second resin part of the coolant outlet comprises a plurality of inner surfaces forming a flow path for the coolant, and wherein the sacrificial electrode is fixedly disposed on at least one of the inner surfaces.

15. The fuel cell of claim 14, wherein the sacrificial electrode comprises a first coupling part, and wherein the second resin part of the coolant outlet further comprises a second coupling part to be clamped to the first coupling part.

16. The fuel cell of claim 14, further comprising:

a cover having an opening so that the flow path is exposed while the sacrificial electrode is covered, wherein the second resin part of the coolant outlet further comprises:

a cover receiving groove formed around the flow path on an outer side surface of the second end plate and configured to receive therein the cover; and a cover fixing part configured to fix the cover to the second resin part.

17. The fuel cell of claim 1, wherein the first resin part is located directly at the coolant inlet.

18. The fuel cell of claim 1, wherein the second resin part is located directly at the coolant outlet.

19. The fuel cell of claim 1, wherein the first resin part is located in the coolant inlet, and wherein the second resin part is located in the coolant outlet.

20. The fuel cell of claim 1, wherein the first resin part provides a portion of an inner surface of the coolant inlet, and wherein the second resin part provides a portion of an inner surface of the coolant outlet.

* * * * *